(12) United States Patent
Sakuma et al.

(10) Patent No.: US 12,003,159 B2
(45) Date of Patent: Jun. 4, 2024

(54) MULTI-AXIS LINEAR MOTOR ACTUATOR

(71) Applicant: NIPPON PULSE MOTOR CO., LTD., Tokyo (JP)

(72) Inventors: Kensuke Sakuma, Tokyo (JP); Tetsuo Ishiwari, Tokyo (JP)

(73) Assignee: NIPPON PULSE MOTOR CO., LTD., Tokyo (JP)

( * ) Notice: Subject to any disclaimer, the term of this patent is extended or adjusted under 35 U.S.C. 154(b) by 125 days.

(21) Appl. No.: 17/918,819

(22) PCT Filed: Feb. 5, 2021

(86) PCT No.: PCT/JP2021/004284
§ 371 (c)(1),
(2) Date: Oct. 13, 2022

(87) PCT Pub. No.: WO2021/215075
PCT Pub. Date: Oct. 28, 2021

(65) Prior Publication Data
US 2023/0155469 A1    May 18, 2023

(30) Foreign Application Priority Data
Apr. 24, 2020    (JP) .................................. 2020-077351

(51) Int. Cl.
*H02K 41/03*    (2006.01)
*H02K 11/01*    (2016.01)
(Continued)

(52) U.S. Cl.
CPC .......... *H02K 41/03* (2013.01); *H02K 11/0141* (2020.08)

(58) Field of Classification Search
CPC ............................ H02K 41/03; H02K 11/0141
(Continued)

(56) References Cited

U.S. PATENT DOCUMENTS

| 5,831,352 A | 11/1998 | Takei | |
|---|---|---|---|
| 2011/0052348 A1* | 3/2011 | Hanamura | H02K 11/0141 310/12.13 |
| 2014/0292110 A1* | 10/2014 | Tang | H02K 41/031 310/12.21 |

FOREIGN PATENT DOCUMENTS

| JP | H07-163128 A | 6/1995 |
|---|---|---|
| JP | 2006-180645 A | 7/2006 |

(Continued)

OTHER PUBLICATIONS

International Search Report in PCT/JP2021/004283, mailed Apr. 6, 2021.

(Continued)

*Primary Examiner* — Erick D Glass
(74) *Attorney, Agent, or Firm* — Collard & Roe, P.C.

(57) ABSTRACT

A multi-axis linear motor actuator has a circuit board having a size covering coil portions in linear shaft motors arranged in a row, and combined with the linear shaft motors to be adjacent thereto and parallel to its arrangement direction; and magnetic shielding plates, longer than the coil portions, arranged and fixed along an axial direction at positions corresponding to positions between adjacent coil portions. Hall sensors are installed in the circuit board in each region corresponding to each linear shaft motor at intervals in a moving direction of a shaft of each linear shaft motor. Each magnetic shielding plate has a wide portion with a width greater than a diameter of the coil portion at a part corresponding to the region where the Hall sensors are installed. The circuit board has first slits for inserting the wide portions. The Hall sensors are installed adjacent to the wide portion.

4 Claims, 20 Drawing Sheets

(51) Int. Cl.
   *H02P 1/00*         (2006.01)
   *H02P 3/00*         (2006.01)
   *H02P 5/00*         (2016.01)
(58) Field of Classification Search
   USPC .......................................................... 318/135
   See application file for complete search history.

(56)                References Cited

FOREIGN PATENT DOCUMENTS

| JP | 2009-115171 A | 5/2009 |
| JP | 2012-090492 A | 5/2012 |
| JP | 2017-139861 A | 8/2017 |
| JP | 6651142 B2    | 2/2020 |
| WO | 2006/068322 A1 | 6/2006 |

OTHER PUBLICATIONS

International Search Report in PCT/JP2021/004284, mailed Apr. 6, 2021.

* cited by examiner

MULTI-AXIS LINEAR MOTOR ACTUATOR

CROSS REFERENCE TO RELATED APPLICATIONS

This application is the National Stage of PCT/JP2021/004284 filed on Feb. 5, 2021, which claims priority under 35 U.S.C. § 119 of Japanese Application No. 2020-077351 filed on Apr. 24, 2020, the disclosure of which is incorporated by reference. The international application under PCT article 21(2) was not published in English.

TECHNICAL FIELD

The present invention relates to a multi-axis linear motor actuator and, more particularly, to a multi-axis linear motor actuator suitable for a multi-axis dispensing device.

BACKGROUND ART

One type of linear motor is referred to as a linear shaft motor. The linear shaft motor has a structure including a coil portion formed by stacking a plurality of cylindrical coils in a center axis direction thereof, and a magnet portion formed by connecting a plurality of permanent magnets in series with the same magnetic poles faced to each other and fixing the plurality of permanent magnets to a support member longer than the plurality of connected permanent magnets to form a shaft, wherein the shaft is inserted through a center hole of the coil portion via a small gap. The plurality of coils are divided into three phases of a U phase, a V phase, and a W phase, AC currents shifted in phase by 120 degrees are made to flow through the coils of the respective phases so that a thrust force for driving the shaft in a center axis direction thereof is obtained by an action of a magnetic field generated by the permanent magnets and the currents flowing through the coils (Patent Document 1).

Such a linear shaft motor is applied to various fields such as a handling device for an electronic component, a dispensing device for sucking and discharging a small amount of liquid, and the like. Generally, in any of the handling device, the dispensing device, and the like, the shaft of the linear shaft motor is assumed to be a first shaft and a hollow second shaft is combined with the first shaft in parallel with a center axis direction of the first shaft so as to move up and down integrally with the first shaft, thereby providing a linear motor actuator. A hollow space of the second shaft is configured to be used for handling by air or sucking and discharging the liquid.

For example, in the case of the handling device, a jig such as a vacuum suction apparatus is attached to a tip of the second shaft to handle the electronic component in synchronization with up-and-down movement of the first shaft (Patent Document 2). On the other hand, in the case of the dispensing device, a nozzle is attached to the tip of the second shaft to form a dispensing head, and an internal pressure of the nozzle is appropriately increased or decreased in synchronization with the up-and-down movement of the first shaft to thereby suck and discharge the liquid.

PRIOR ART DOCUMENT

Patent Document(s)

Patent Document 1: JP 2017-139861 A
Patent Document 2: JP 2012-090492 A

SUMMARY OF THE INVENTION

Problem to be Solved by the Invention

In recent years, there is provided a device called a multi-axis linear motor actuator in which a plurality of the above-mentioned linear motor actuators, each comprising a combination of the first shaft and the second shaft, are arranged in a row and collectively perform the same operation so as to improve work efficiency. For example, the multi-axis linear motor actuator is applied as a multi-axis dispensing device which includes a plurality of the above-mentioned dispensing devices individually manufactured and arranged in a row to perform a dispensing operation in the fields of medicines, cosmetics, biotechnology, etc. According to the multi-axis dispensing device, the plurality of dispensing devices collectively perform the same operation and action. Therefore, the multi-axis dispensing device is effective in achieving significant labor-saving and in preventing dispensing errors as compared with a dispensing operation by a manual operation.

For example, when the conventional multi-axis dispensing device is combined with a 96 (8 samples×12 rows) specimen microplate as a clinical examination device, eight dispensing devices are assembled to be arranged in a row to form an 8-axis simultaneous control, that is, a multi-axis dispensing device. The multi-axis dispensing device is reciprocated by a transport mechanism between a sucking location of a liquid (for example, a reagent) and a discharging location (i.e., the microplate). Therefore, the conventional multi-axis dispensing device is generally manufactured by a combination of the plurality of dispensing devices individually manufactured, and is capable of carrying out only a dispensing operation of discharging the same amount of the reagent to the microplate at the same timing.

In the meanwhile, for the multi-axis dispensing device, there is an increasing demand that each of the plurality of dispensing devices be independently controllable. According to a multi-axis independent-control dispensing device, it is possible to discharge individual amounts of the reagent to the microplates at individual timings for respective axes even in the same row, and to monitor reaction of specimens. That is, it is possible to set the amount of the reagent to be discharged to the microplate and the timing for each sample, and to execute suction and discharge of the reagent in an automated control mode, thereby obtaining an objective and highly reliable examination result.

In the multi-axis independent-control dispensing device, it is essential to perform position control of the dispensing head for each axis. In the past, position control of the linear shaft motor is generally performed by detecting a position of a movable portion in the linear shaft motor using a linear scale.

However, the linear scale is expensive and cost of parts is increased as the number of axes is larger. Therefore, it is desired to provide inexpensive position detecting means.

In view of the problem and the demand described above, it is an object of the present invention to provide a multi-axis linear motor actuator capable of inexpensively achieving position detecting means for position control of linear shaft motors of multiple axes in the multi-axis linear motor actuator.

It is a specific object of the present invention to inexpensively achieve position detecting means for position control in a multi-axis independent-control dispensing device.

Means for Solving the Problem

According to one aspect of the present invention, there is provided a multi-axis linear motor actuator comprising a plurality of linear shaft motors arranged in a row at a predetermined pitch, the linear shaft motors each comprising a magnet portion for the linear shaft motor and a coil portion for the linear shaft motor, the magnet portion including a plurality of permanent magnets which are connected to each other with the same magnetic poles faced to each other and which are fixed to a support member having a length equal to or longer than a total length of the plurality of permanent magnets connected to each other to form a shaft movable in an axial direction, the coil portion including a plurality of cylindrical coils connected to each other in a center axis direction and combined with the shaft to concentrically enclose the shaft via a gap so that the shaft is movable with respect to the axial direction, the multi-axis linear motor actuator including:

a circuit board which has a size sufficient to cover a plurality of the coil portions in the plurality of linear shaft motors arranged in a row and which is combined with the plurality of linear shaft motors so as to be adjacent thereto and parallel to an arrangement direction of the plurality of linear shaft motors; and
  a plurality of magnetic shielding plates, longer than the coil portion, each arranged and fixed along the axial direction at least at a position corresponding to a position between adjacent ones of the plurality of coil portions arranged in a row; and
  a pair of Hall sensors installed in the circuit board in each of regions corresponding to the shafts, same in number as the plurality of linear shaft motors, at intervals in a moving direction of the shaft;
  each of the magnetic shielding plates having a wide portion with a width greater than a diameter of the coil portion at least at a part corresponding to the region where the pair of Hall sensors are installed;
  the circuit board being provided with a plurality of first slits each for inserting the wide portion;
  the pair of Hall sensors being installed adjacent to the wide portion of the magnetic shielding plate.

Preferably, the pair of Hall sensors are installed on a surface of the circuit board that is opposite to another surface faced to the coil portion; and
  an interval between the pair of Hall sensors is set so as to correspond to an electrical angle of 90 degrees of a sine waveform of a surface magnetic flux density of the magnet portion.

Preferably, the multi-axis linear motor actuator further comprises a coil fixing member having a receiving portion in which the plurality of coil portions in the plurality of linear shaft motors are fixed in a state of being arranged in a row at the predetermined pitch; and
  the circuit board is attached to the receiving portion of the coil fixing member.

Effect of the Invention

According to the present invention, the position detecting means for position control of the linear shaft motors of the respective axes in the multi-axis linear motor actuator can be realized inexpensively and, as a result, the multi-axis linear motor actuator effective in cost reduction can be provided.

MODE FOR CARRYING OUT THE INVENTION

At first, as a preferred embodiment of a multi-axis linear motor actuator according to the present invention, an 8-axis independent-control dispensing device will he described with reference to FIGS. 1 to 9.

Figure 1:
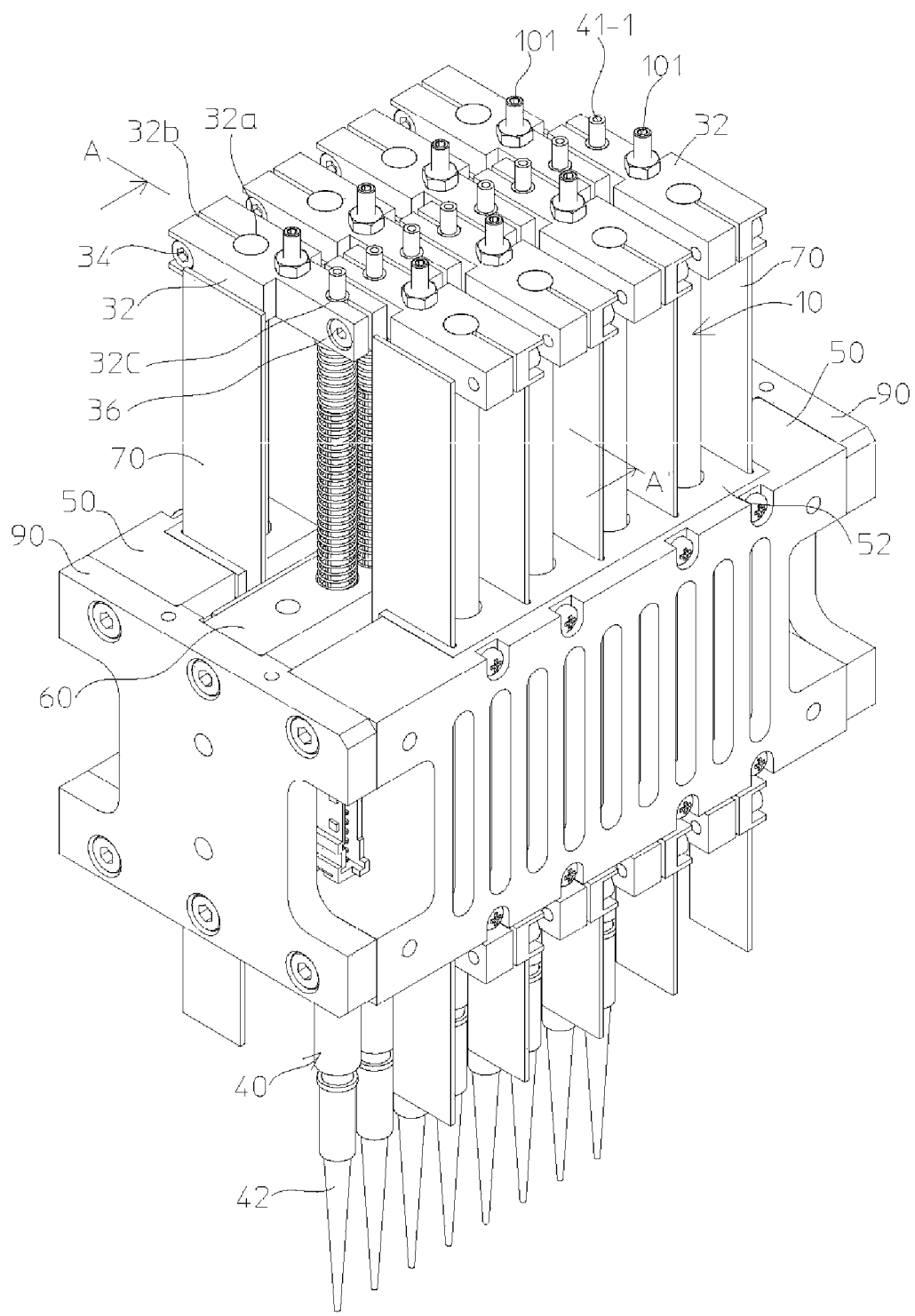
FIG. 1 is a perspective view of an 8-axis independent-control dispensing device according to the present invention.
Figure 2:
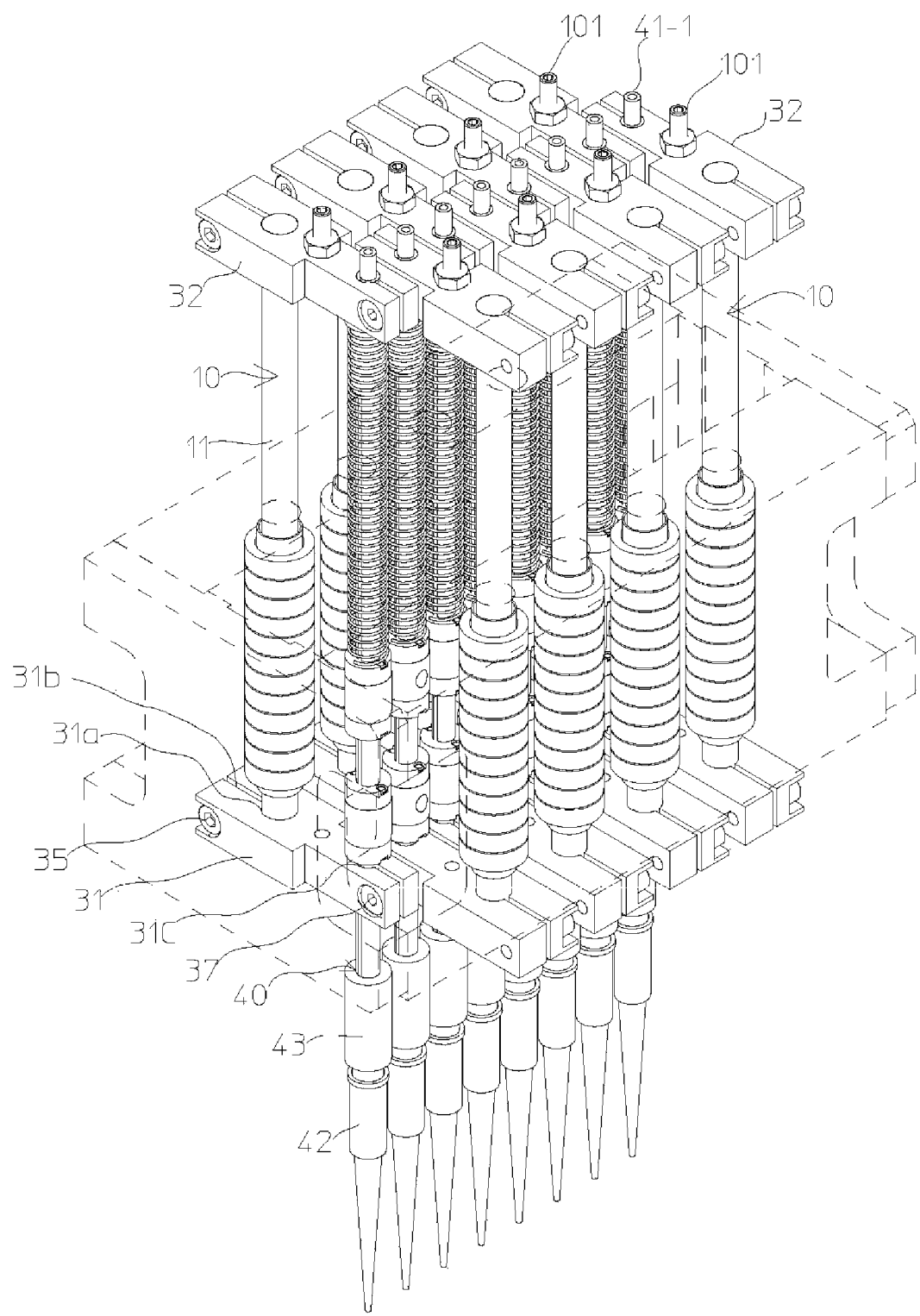
FIG. 2 is a perspective view of a plurality of linear shaft motors, a plurality of dispensing heads, and upper and lower connecting members, which are extracted from the 8-axis independent-control dispensing device shown in FIG. 1.
Figure 3:
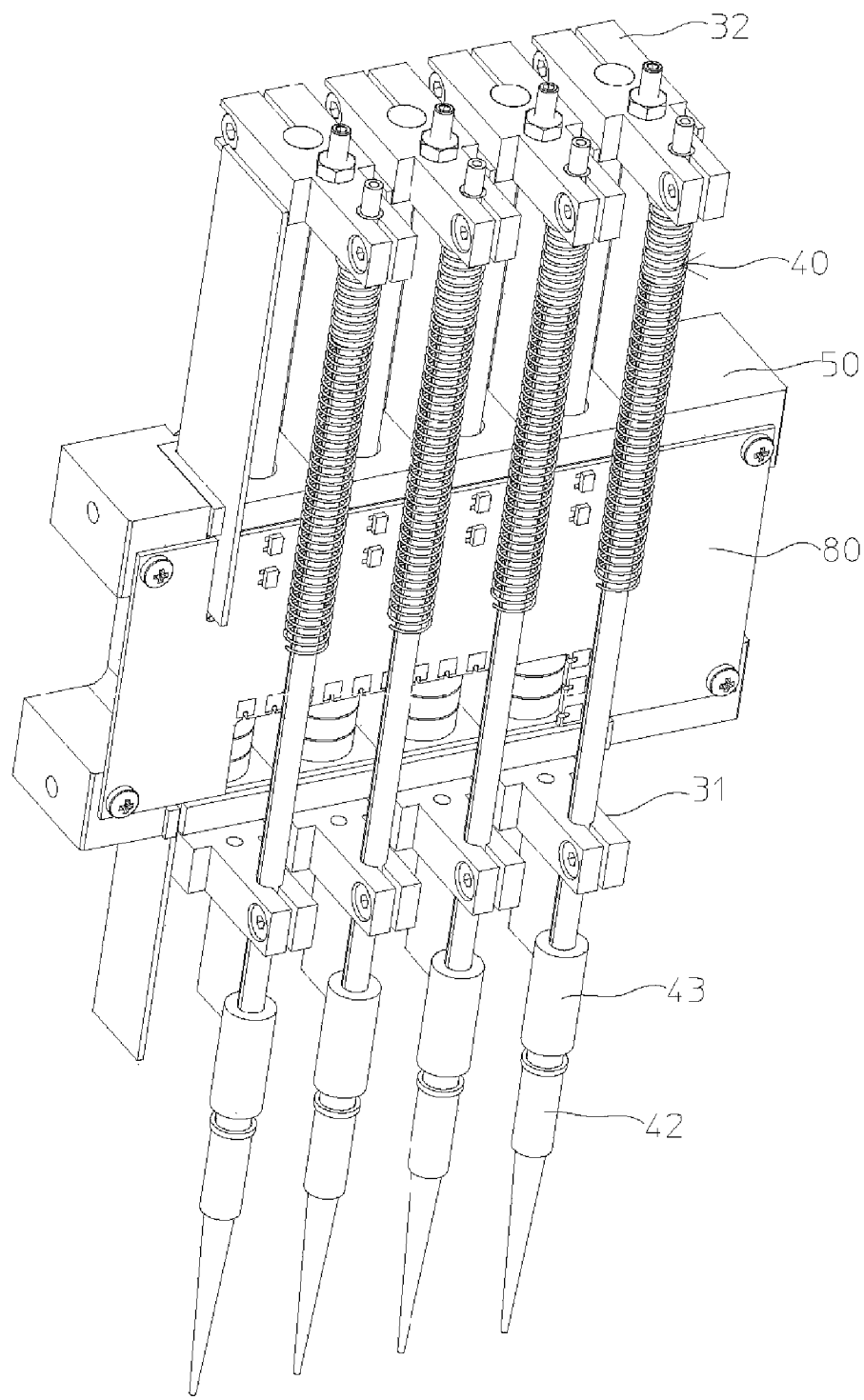
FIG. 3 is a perspective view of four combinations of the linear shaft motors and the dispensing heads (4-axis independent-control dispensing device) which are extracted from the 8-axis independent-control dispensing device shown in FIG. 1 and which are located on the left side in the figure.
Figure 4:
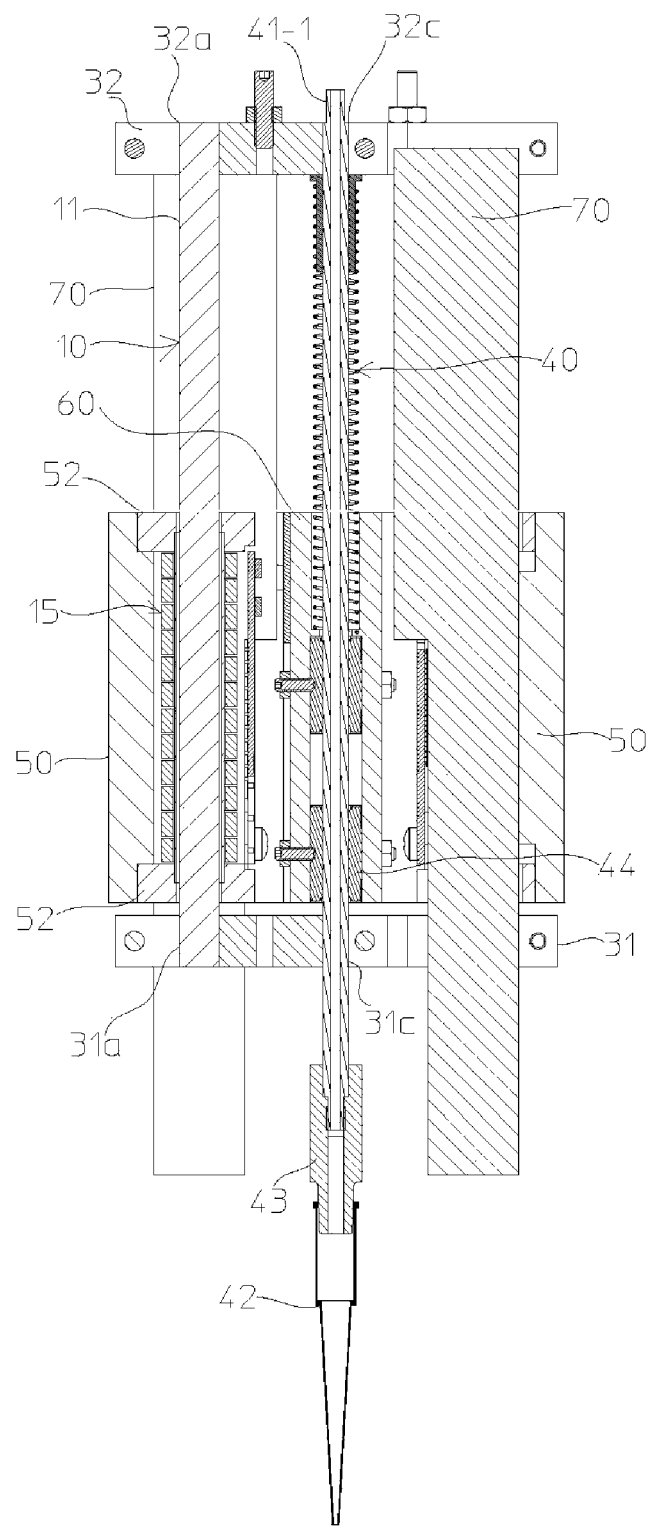
FIG. 4 is a longitudinal sectional view taken along a line A-A' in FIG. 1.
Figure 5:
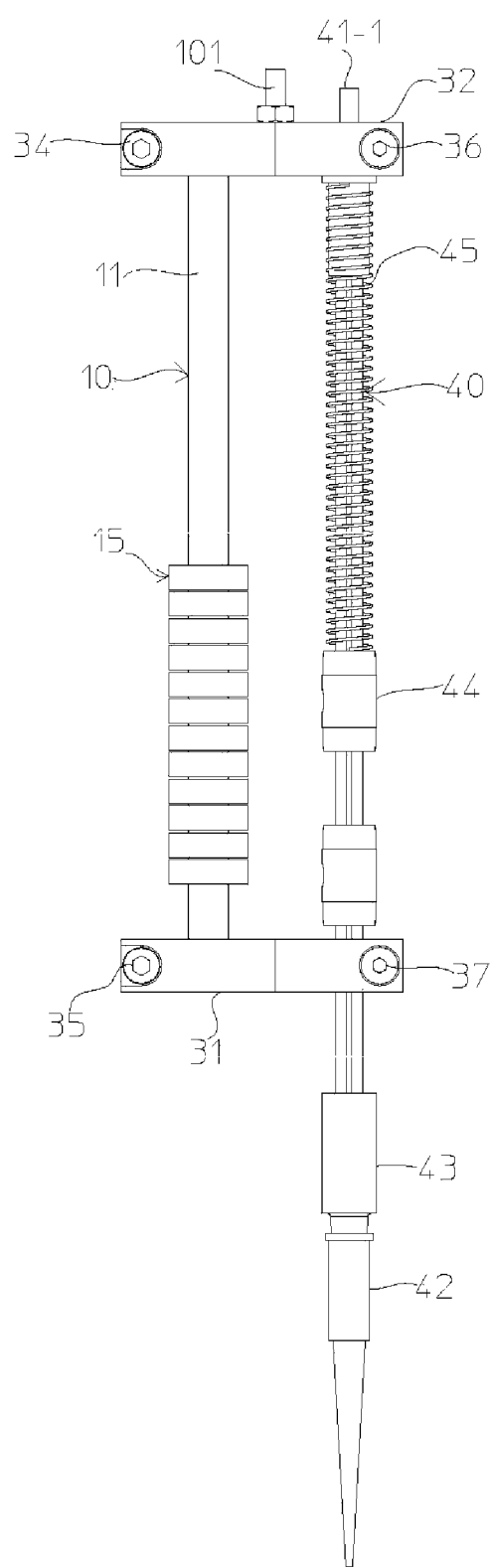
FIG. 5 is a side view of a combination of the linear shaft motor and the dispensing head, and the upper and lower connecting members, which are extracted from the 8-axis independent-control dispensing device shown in FIG. 1.
Figure 6:
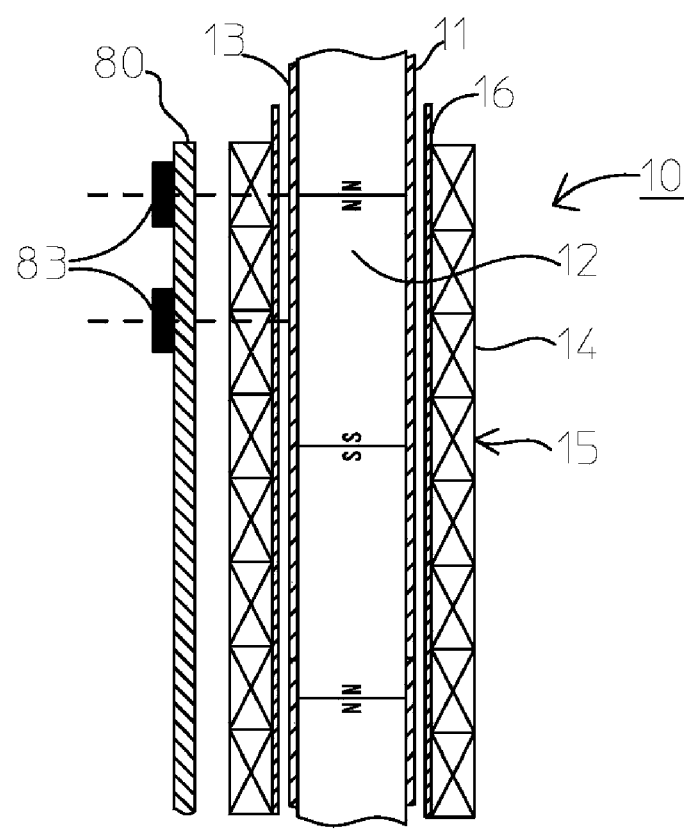
FIG. 6 is a cross-sectional view of an internal structure of a part of the linear shaft motor shown in FIG. 5.

FIGS. 1 and 2 show the 8-axis independent-control dispensing device (hereinafter may be referred to as an 8-axis dispensing device) to which the present invention is applied. FIG. 3 shows a half of the 8-axis independent-control dispensing device, that is, a 4-axis independent-control dispensing device (hereinafter may be referred to as a 4-axis dispensing device). FIG. 4 is a longitudinal sectional view taken along a line A-A' in FIG. 1. FIG. 5 is a side view of a combination of a linear shaft motor and a dispensing head, and upper and lower connecting members, which are extracted from the 8-axis independent-control dispensing device shown in FIG. 1. FIG. 6 is a cross-sectional view of an internal structure of a part of the linear shaft motor.

First, the internal structure of the linear shaft motor will be described. However, since the linear shaft motor of this type is well known, brief description only is given.

Referring to FIG. 6, the linear shaft motor 10 has a first shaft 11 including a plurality of permanent magnets 12 magnetized in a center axis direction and, in the state of being connected to each other in series with the same magnetic poles faced to each other, accommodated in and fixed to a cylindrical body (support member) 13 made of a non-magnetic material. The cylindrical body 13 has a length equal to or longer than the total length of the plurality of permanent magnets 12. A part of the cylindrical body 13 that accommodates the plurality of permanent magnets 12 may be referred to as a magnet portion for the linear shaft motor 10. As will later be described, in the magnet portion, the permanent magnets 12 having the same shape and the same magnetic force are faced to each other so that, in the periphery of the first shaft 11 (magnet portion), N poles and S poles alternately appear at the same pitch in an axial direction. When a surface magnetic flux density thereof is measured, a sinusoidal waveform appears. The linear shaft motor 10 also has, as a coil portion 15, a plurality of cylindrical coils 14 connected to each other in series so as to concentrically enclose the first shaft 11 via a gap. In the coil portion 15, the plurality of cylindrical coils 14 are connected to each other in series on an outer periphery of a coil integration cylinder 16 of resin to be integrated. The coil integration cylinder 16 has an inner diameter larger than an outer diameter of the cylindrical body 13. The first shaft 11 and the coil portion 15 are configured to be movable relative to each other in the center axis direction. Herein, the first shaft 11 is configured to be a movable portion and the coil portion 15 is configured to be a fixed portion.

The coil portion 15 is composed of at least three coils 14 of a U phase, a V phase, and a W phase to constitute a three-phase linear motor. AC currents having an electric phase difference of 120 degrees are made to flow through the respective coils 14. By controlling energization to each coil 14, a thrust force for driving the first shaft 11 in the center axis direction is obtained by an action of a magnetic field generated from permanent magnets 12 and the currents flowing through the coils 14.

In this description, the meaning of "connecting the permanent magnets to each other" not only includes direct connection of the permanent magnets 12 as shown in FIG. 6, but also includes connection by interposing a soft magnetic material such as soft iron or another permanent magnet magnetized in a radial direction, as a pole piece, between adjacent ones of the permanent magnets 12, in view of magnetic characteristics and a manufacturing process allowing easy assembling by suppressing a repulsive force.

A linear motor drive circuit including a power supply, a linear motor control circuit, and the like are well known and are not essential parts of the present invention. Therefore, illustration and description of those circuits are omitted, and a position control system will briefly be described later.

Referring to FIGS. 4 and 5, in the linear shaft motor 10, a lower connecting member 31 and an upper connecting member 32 are fixed to a lower side and an upper side of the first shaft 11, respectively. Therefore, with up-and-down movement of the first shaft 11 with respect to the coil portion 15 as the fixed portion, the lower connecting member 31 and the upper connecting member 32 integrally move up and down also.

Figure 8:
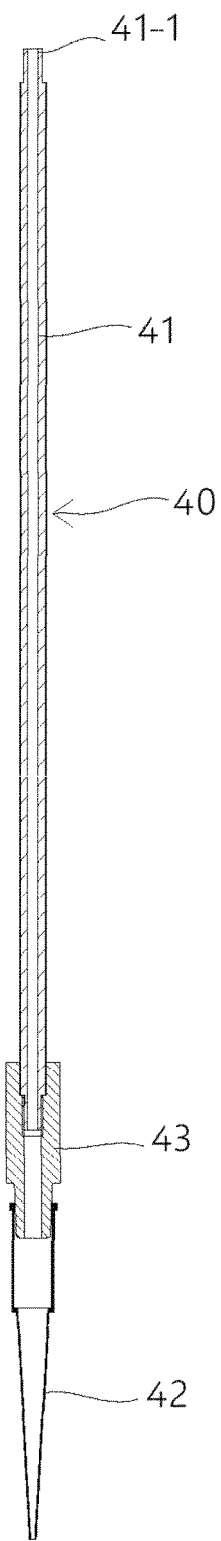
FIG. 8 is a longitudinal sectional view part of the dispensing head shown in FIG. 4.

A dispensing head 40 is attached to the lower connecting member 31 and the upper connecting member 32 in parallel to a center axis of the first shaft 11. Referring to FIG. 8 in addition, the dispensing head 40 has a head body 41 comprising a hollow cylindrical body having a length longer than an interval between the lower connecting member 31 and the upper connecting member 32. The head body 41 has a protruding portion 41-1 formed at an upper end portion thereof and slightly protruding from the upper connecting member 32. On the other hand, a nozzle portion 43 having a chip 42 mounted to its tip is attached to a lower part of the head body 41 protruding from the lower connecting member 31. The dispensing head 40 moves up and down integrally with the first shaft 11 via the lower connecting member 31 and the upper connecting member 32. The dispensing head 40 has a structure preventing rotation around its center axis with a part above the nozzle portion 43, that is, the head body 41, used as a spline shaft. Specifically, spline grooves (or ridges) extending in the center axis direction are provided on an outer periphery of the head body 41 as the spline shaft. On the other hand, ball splines 44 are provided as a fixed portion near an upper side of the lower connecting member 31, and ridges (or grooves) extending in the center axis direction are formed on an inner periphery of the ball splines. The head body 41 is attached to the ball splines 44 so that the spline grooves (or ridges) are fitted to the ridges (or grooves). Around the head body 41 between the upper connecting member 32 and the ball spline 44 on an upper side, a compression spring 45 is provided to prevent the dispensing head 40 from falling down and to hold the dispensing head 40 at a predetermined lower limit position when a dispensing operation is off, that is, when the linear shaft motor 10 is powered off.

In order to fix an upper end portion of the first shaft 11 to the upper connecting member 32, in this embodiment, the upper connecting member 32 is provided with a through hole 32a for inserting the first shaft 11, and a slot 32b extending from the through hole 32a to one end of the upper connecting member 32, as shown in FIG. 1. Furthermore, a hexagonal socket screw 34 can be screwed at the one end of the upper connecting member 32 to extend from one side surface to the other side surface across the slot 32b. With such a structure, the upper end portion of the first shaft 11 inserted into the through hole 32a is fixed in the through hole 32a by fastening of the hexagonal socket screw 34.

A fixing structure similar to that described above is also applied at a lower end of the first shaft 11. Specifically, with reference to FIGS. 2 and 5 in addition, a lower end portion of the first shaft 11 inserted into a through hole 31a formed in the lower connecting member 31 is fixed in the through hole 31a by fastening of a hexagonal socket screw 35. In order to enable the fastening by the hexagonal socket screw 35, the lower connecting member 31 is provided with a slot 31b extending from the through hole 31a to one end of the lower connecting member 31, like in the upper connecting member 32.

By applying a fixing structure (combination of a through hole, a slot, and a hexagonal socket screw) similar to that described above, an upper end of the head body 41 and a middle part of the head body 41 slightly above the nozzle portion 43 are also fixed in a through hole 32c of the upper connecting member 32 and a through hole 31c of the lower connecting member 31 by fastening of hexagonal socket screws 36 and 37.

A structure for making the coil portion 15 and the ball splines 44 act as the fixed portions will later be described.

As will be understood from FIG. 3, the 4-axis dispensing device is composed of four combinations of the linear shaft motors 10 and the dispensing heads 40. The four linear shaft motors 10 and the four dispensing heads 40 are combined so as to be arranged in a row in different planes parallel to each other, respectively.

Figure 7:
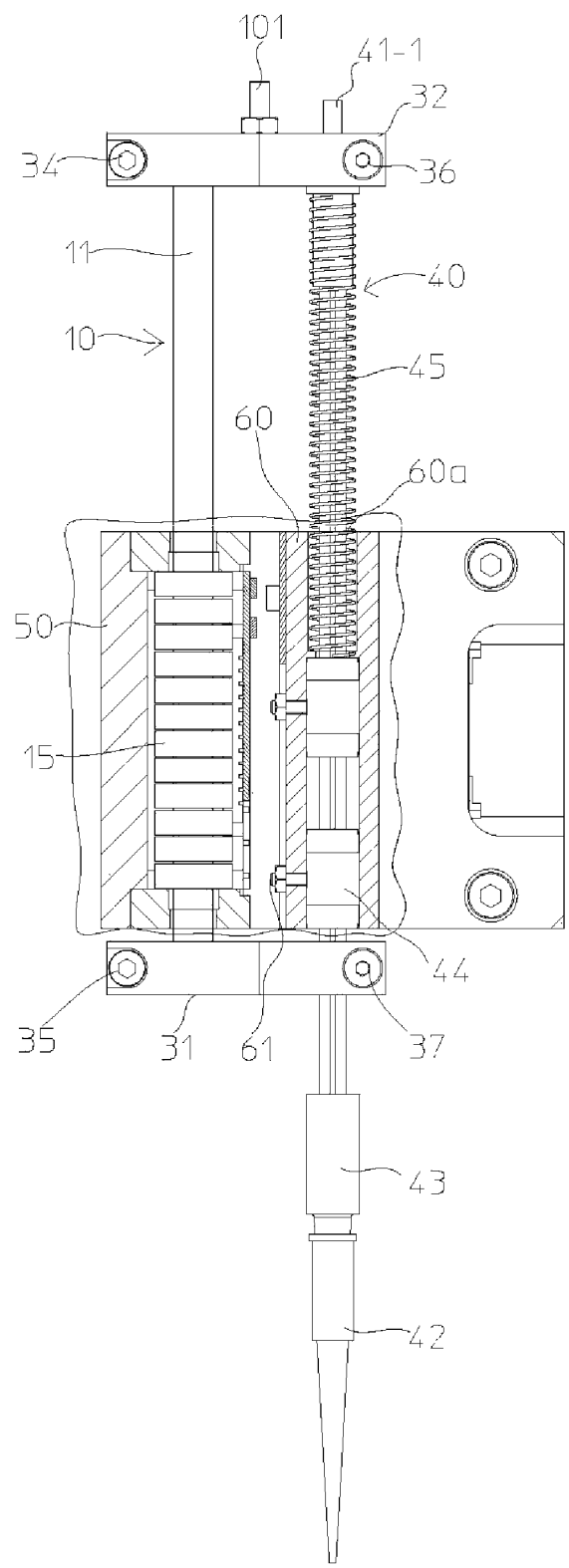
FIG. 7 is a partial cross-sectional side view of the combination of the linear shaft motor, the dispensing head, and peripheral members shown in FIG. 4, in a state where a magnetic shielding plate is removed.
Figure 9:
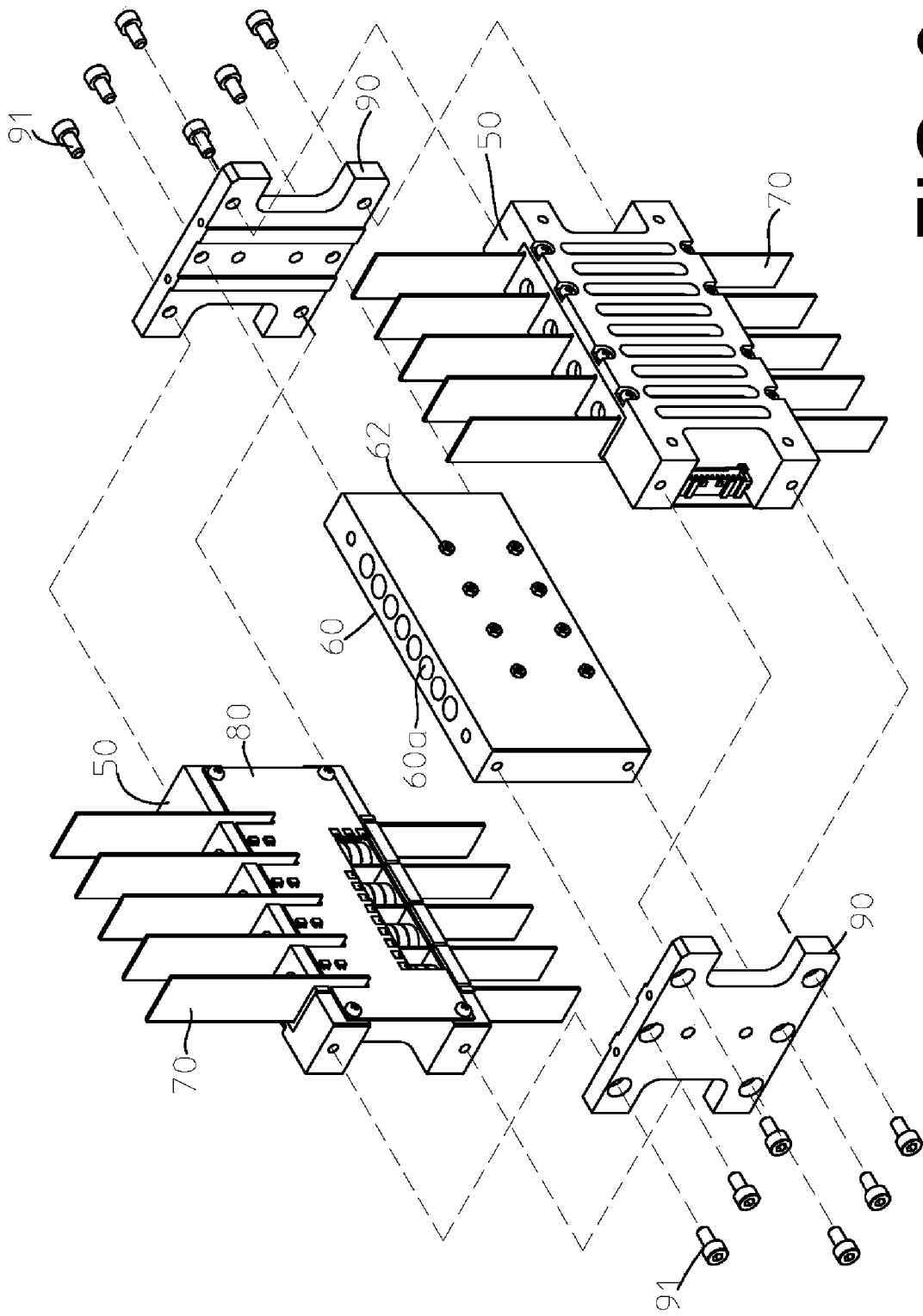
FIG. 9 is an exploded perspective view of a pair of coil units and a center plate, and connecting plates connecting the coil units and the center plate on lateral sides, in the 8-axis independent-control dispensing device shown in FIG. 1.

Referring to FIGS. 4 and 7 in addition, a coil fixing member 50 is used to arrange the four linear shaft motors 10 in a row. On the other hand, a center plate 60 is used to arrange the four dispensing heads 40 in a row. Referring to FIG. 9 in addition, the center plate 60 is shared by the pair of 4-axis dispensing devices when applied to the 8-axis dispensing device. Therefore, the center plate 60 has eight accommodation spaces 60a in which the dispensing heads 40 of one of the pair of 4-axis dispensing devices and the dispensing heads 40 of the other of the pair of 4-axis dispensing devices are alternately arranged and accommodated. Each accommodation space 60a accommodates the ball splines 44 and a part of the dispensing head 40 with the compression spring 45 attached thereto. The ball splines 44 are fixed by a plurality of (herein, two) screws 61 screwed through a side wall of the center plate 60 so as not to rotate about the center axis in the accommodation space 60a. FIG. 7 shows the screws 61 applied to the ball splines 44 for the dispensing heads 40 of one of the pair of 4-axis dispensing devices. As shown in FIG. 9, screws 62 for fixing the ball splines for the dispensing heads 40 of the other of the pair of 4-axis dispensing devices are screwed into an opposite side wall of the center plate 60.

As will later be described and, therefore, is briefly described herein, the 4-axis dispensing device as shown in FIG. 3 is assembled as follows. However, the 4-axis dispensing device shown in FIG. 3 is given as a so-called partially-omitted diagram for easy understanding of the description, and is not manufactured in a configuration as illustrated in FIG. 3. This is because the dispensing heads 40 are incorporated into the 8-axis dispensing device in a state of being accommodated in the center plate 60 described with reference to FIGS. 7 and 9.

First, the four coil portions 15 are arranged at predetermined intervals and fixed in the coil fixing member 50 and, thereafter, the first shaft 11 is inserted through each coil portion 15. Subsequently, the lower connecting member 31 and the upper connecting member 32 are fixed to the lower end portion and the upper end portion of each of the first shafts 11, respectively. Next, the chips 42 and the nozzles 43 are removed from the four dispensing heads 40 alternately accommodated in the accommodation spaces 60a of the center plate 60. A lower part of the head body 41 is fixed to the lower connecting member 31, and the upper end of the head body 41 is fixed to the upper connecting member 32. Thereafter, the nozzle 43 and the chip 42 are mounted to the head body 41. As described above, the 4-axis dispensing device as a half of the 8-axis dispensing device is assembled on one side wall of the center plate 60 shown in FIG. 9. Similarly, another 4-axis dispensing device as a remaining half of the 8-axis dispensing device is assembled on the other side wall of the center plate 60. As a result, the 8-axis dispensing device as shown in FIG. 1 is completed. This assembling will later be described also.

Next, referring to FIGS. 10A to 14 in addition, a method of manufacturing a coil unit will be described.

FIGS. 10A to 10D are perspective views sequentially illustrating a manufacturing process of the coil unit when the present invention is applied to the 4-axis independent-control dispensing device.

Figure 10A:
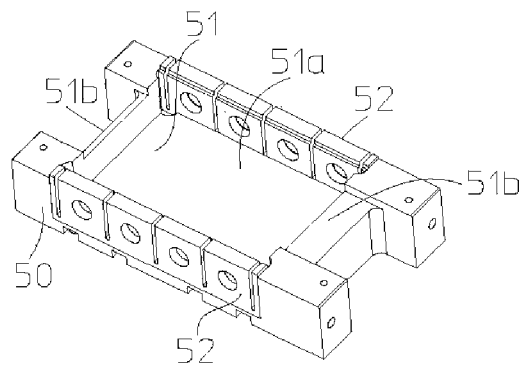
FIGS. 10A to 10D are perspective views for sequentially describing a manufacturing process of the coil unit of the 4-axis independent-control dispensing device according to the present invention.

In FIGS. 10A to 10D, at first, the coil fixing member 50 is prepared (FIG. 10A). The coil fixing member 50 has a receiving portion 51 capable of receiving the four-coil portions 15 in a state of being arranged in a row at a predetermined pitch P1. Referring to FIG. 11 in addition, each of the coil portions 15 is formed by connecting the plurality of coils 14 in series and fixing the coils to the outer periphery of the coil integration cylinder 16 of resin. The coil integration cylinder 16 has an inner diameter slightly larger than an outer diameter of the first shaft 11 and a length including protrusions 16-1 protruding from the coils 14 at both ends among the plurality of coils. As described above, the plurality of coils 14 are arranged so that three coils of U phase—V phase—W phase are grouped as a set, and delta or star connection is performed.

Figure 10B:
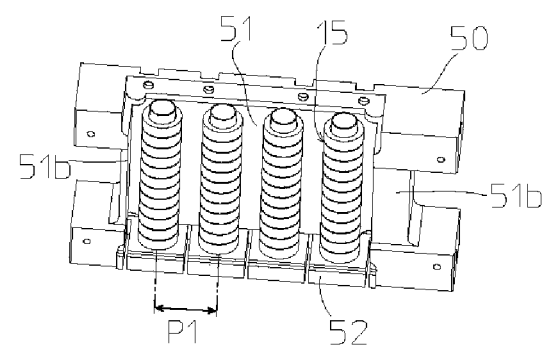
Figure 11:
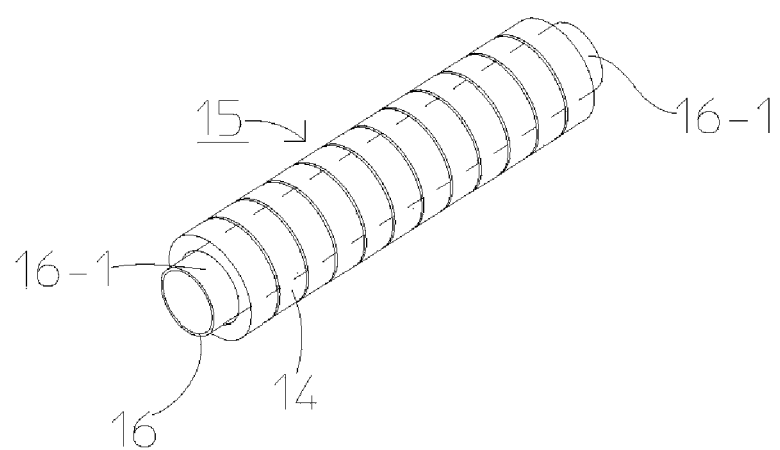
FIG. 11 is a perspective view of a coil portion as a component of the coil unit shown in FIGS. 10A to 10D.

Next, as shown in FIG. 10B, the four coil portions 15 are arranged in a row at the predetermined pitch P1 in the receiving portion 51 of the coil fixing member 50.

Figure 12:
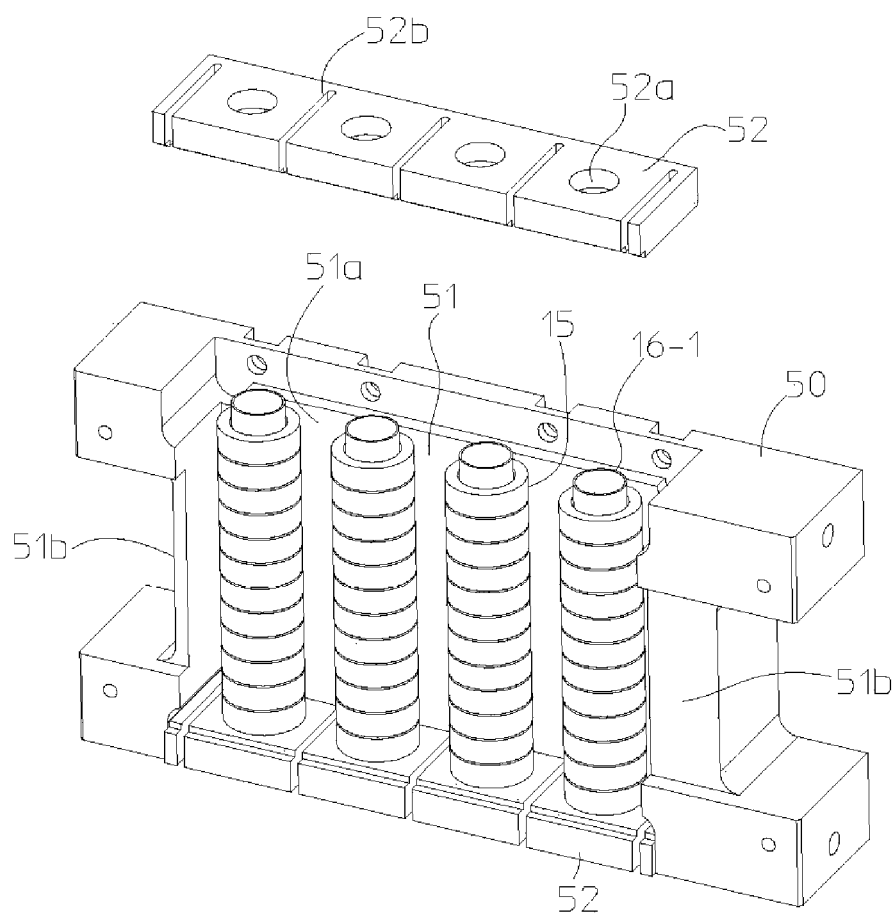
FIG. 12 is a partially-exploded perspective view of he coil unit shown in FIGS. 10A to 10D.

Referring to FIG. 12, the receiving portion 51 of the coil fixing member 50 is formed by a bottom wall 51a defining a bottom surface of a receiving space for the four coil portions 15 arranged in a row, a pair of wall members 51b faced to each other so as to define the receiving space with respect to a direction parallel to the center axis direction of the coil portions 15, and a pair of coil ends 52 provided between the pair of wall members 51b at both ends of the four coil portions 15. Both ends of the coil fixing member 50 are formed as recessed portions for securing a connection space with an electric circuit mounted to a circuit board which will later be described. Each coil end 52 has four through holes 52a for insertion of the protruding portions 16-1 of the coil integration cylinders 16 that protrude from the both ends of the four coil portions 15, and is removably fixed to the bottom wall 51a by screwing. A protruding length of each protruding portion 16-1 is desirably shorter than a plate thickness of the coil end 52, that is, a length of the through hole 52a.

The coil ends 52 are removable from the bottom wall 51a because the total length of the plurality of coils 14 is substantially equal to an interval between the pair of coil ends 52. Specifically, as shown in FIG. 12, the four coil portions 15 are arranged in the receiving portion 51 by inserting the one protruding portions 16-1 of the four coil portions 15 into the four through holes 52a of one coil end 52 fixed to the bottom wall 51a of the coil receiving portion 51. Thereafter, the other coil end 52 is fixed by screwing to the bottom wall 51a in a state where the other protruding portions 16-1 of the four coil portions 15 are inserted into the through holes 52a.

The coil end 52 is also provided with five slits (second slits) 52b for installing magnetic shielding plates 70 (FIG. 10C), which will later be described, on both sides of the four coil portions 15 disposed in the receiving portion 51 and in parallel to the center axis direction of the coil portions. In other words, the slits 52b are formed on both sides of the through holes 52 to extend in a depth direction from an opening side of the receiving space. It should be noted that at least one of the pair of coil ends 52 must be removable from the bottom wall 51*a*.

Figure 10C:
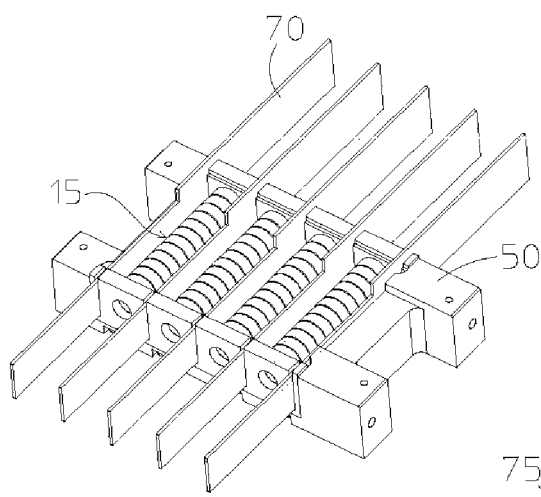
Figure 10D:
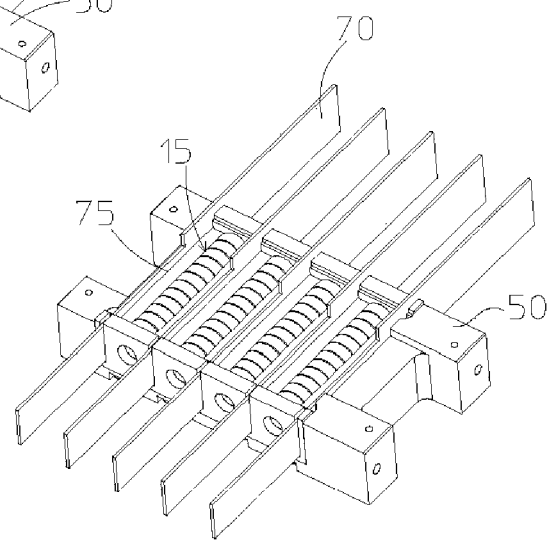

Following the step of arranging the coil portions 15 in FIG. 10B, referring to FIG. 10C, the magnetic shielding plates 70 longer than the coil portions 15 are disposed on both sides of the four coil portions 15 arranged in a row and along the center axis direction of the coil portions. Specifically, the magnetic shielding plates 70, five in total, are fitted one by one to the slits 52*b* of the pair of coil ends 52. The magnetic shielding plates 70 serve to prevent adjacent ones of the linear shaft motors from interfering with each other (for example, corning) by adjacent ones of the coil portions 15 and the permanent magnets 12 in the first shaft 11. Therefore, each magnetic shielding plate 70 is made of a high magnetic permeability material, for example, an SPCC (cold rolled steel plate), and has a length at least over a movable range of the plurality of permanent magnets 12 in the first shaft 11. The width of the magnetic shielding plate 70 is larger than the depth of the receiving space of the receiving portion 51 (the diameter of the coil portion 15), and the width of at least a part corresponding to a partial region of the receiving space is nearly equal to the depth of the receiving space. This aims to provide a structure that the circuit board 80 can be attached to the part corresponding to the partial region of the receiving space, as will later be described with reference to FIG. 14.

Subsequently, referring to FIG. 10(*d*), a curable resin (adhesive) 75 is poured and cured between the coil portions 15 and the magnetic shielding plates 70 in the receiving portion 51. Consequently, the coil portions 15 and the magnetic shielding plates 70 are fixed to the receiving portion 51.

It should be noted that the magnetic shielding plates 70 must be provided at least at positions corresponding to spaces between adjacent ones of the coil portions 15, and the outermost two magnetic shielding plates may be omitted. The coil portions 15 and the magnetic shielding plates 70 may be fixed by a fixing method other than bonding by the curable resin 75.

Figure 13:
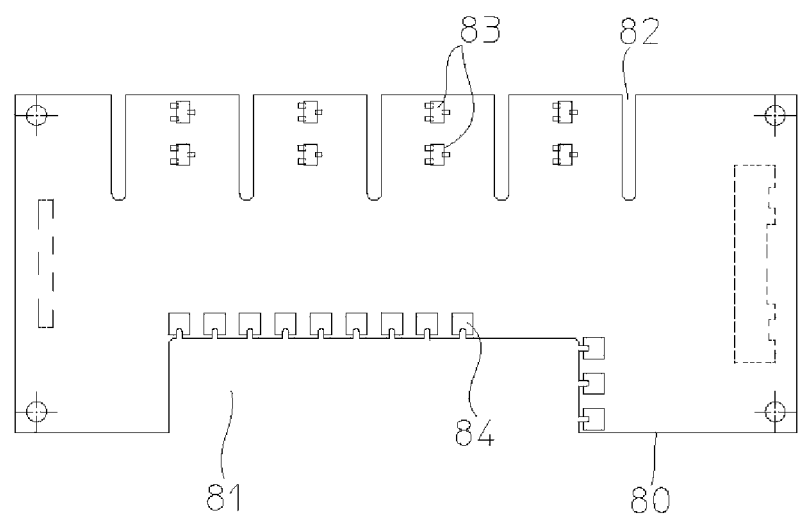
FIG. 13 is a view showing an example of a circuit board attached to the coil unit shown in FIGS. 10A to 10D.
Figure 14:
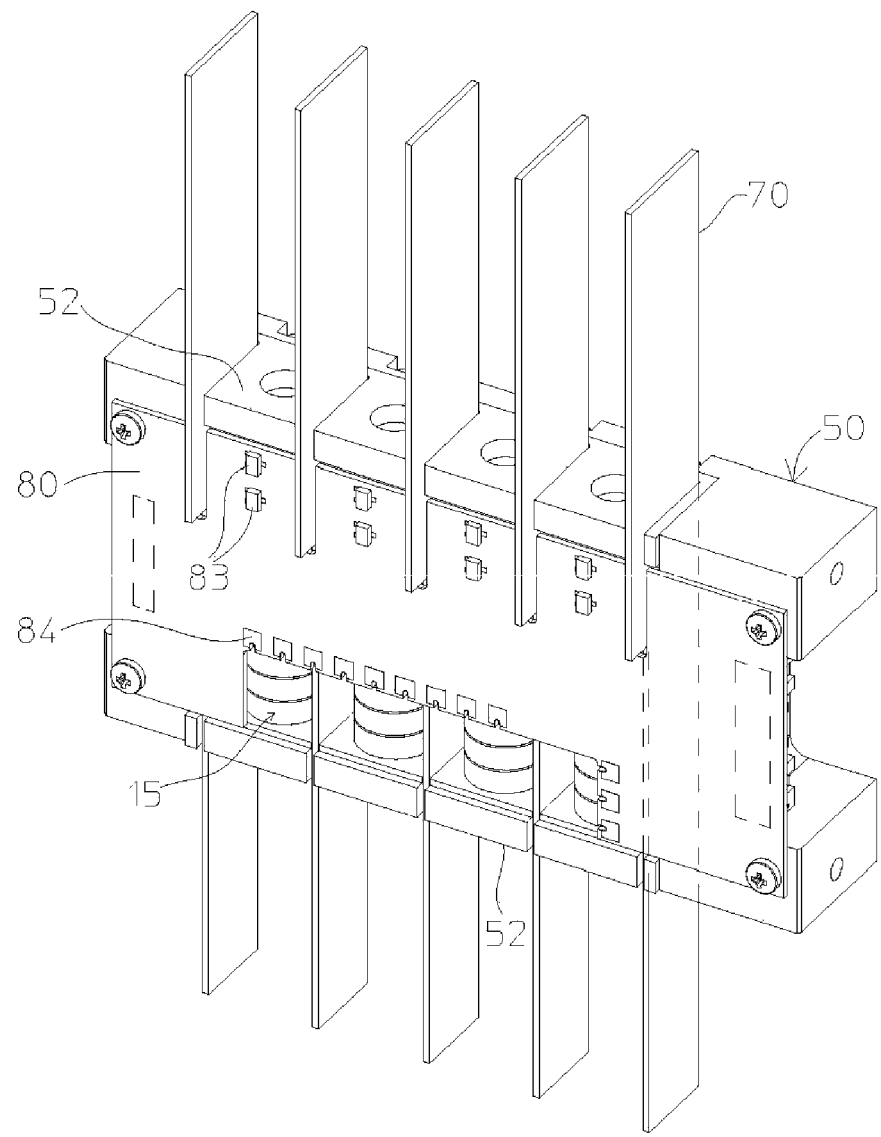
FIG. 14 is a perspective view of the left coil unit in the pair of coil units shown in FIG. 9 as seen from a different angle.

FIG. 13 shows an example of the circuit board 80 to be installed on the opening side of the receiving space in the coil unit manufactured by the manufacturing method of FIGS. 10A to 10D. FIG. 14 shows an example of the coil unit with the circuit hoard 80 installed in the receiving portion 51 by screwing.

The circuit board 80 is disposed adjacent to the four linear shaft motors 10 so as to be parallel to an arrangement direction thereof. The circuit board 80 is disposed at an opening of the receiving space because a location as close as possible to the coil portions 15 is desirable in consideration of easy connection with the coil portions 15, which will later be described, and installation of Hall sensors which will later be described. The circuit board 80 has a size capable of covering the four coil portions 15, in other words, a size capable of covering the opening of the receiving portion 51 of the coil fixing member 50. The circuit board 80 also has a cutout 81 for exposing a part of the four coil portions 15, and five slits (first slits) 82 for allowing wide portions, having a large plate width, of the magnetic shielding plates 70 to protrude from the circuit board 80. The cutout 81 is formed so as to facilitate electrical connection (not shown) between coil connection conductive patterns 84 formed at a peripheral edge of the cutout and the four coil portions 15. On the other hand, the slits 82 are formed at positions located on an upper side of the circuit board 80 during operation. Therefore, even if the magnetic shielding plate 70 is peeled off from the receiving portion 51 due to bonding failure, a lower end portion of the wide portion is caught by a lower end edge of the slit 82 to prevent the magnetic shielding plate 70 from falling down to the microplate.

Figure 18:
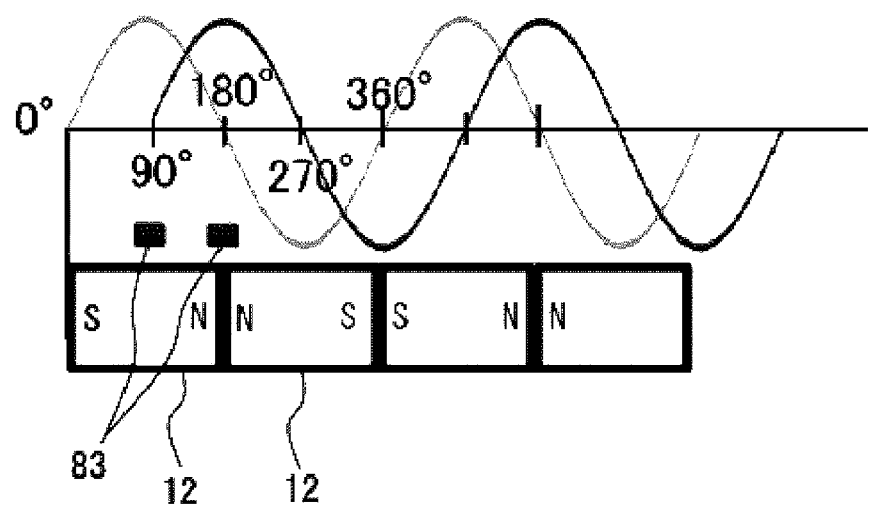
FIG. 18 is a view for describing mounting intervals of a pair of Hall sensors installed for position control in the linear shaft motor.
Figure 19:
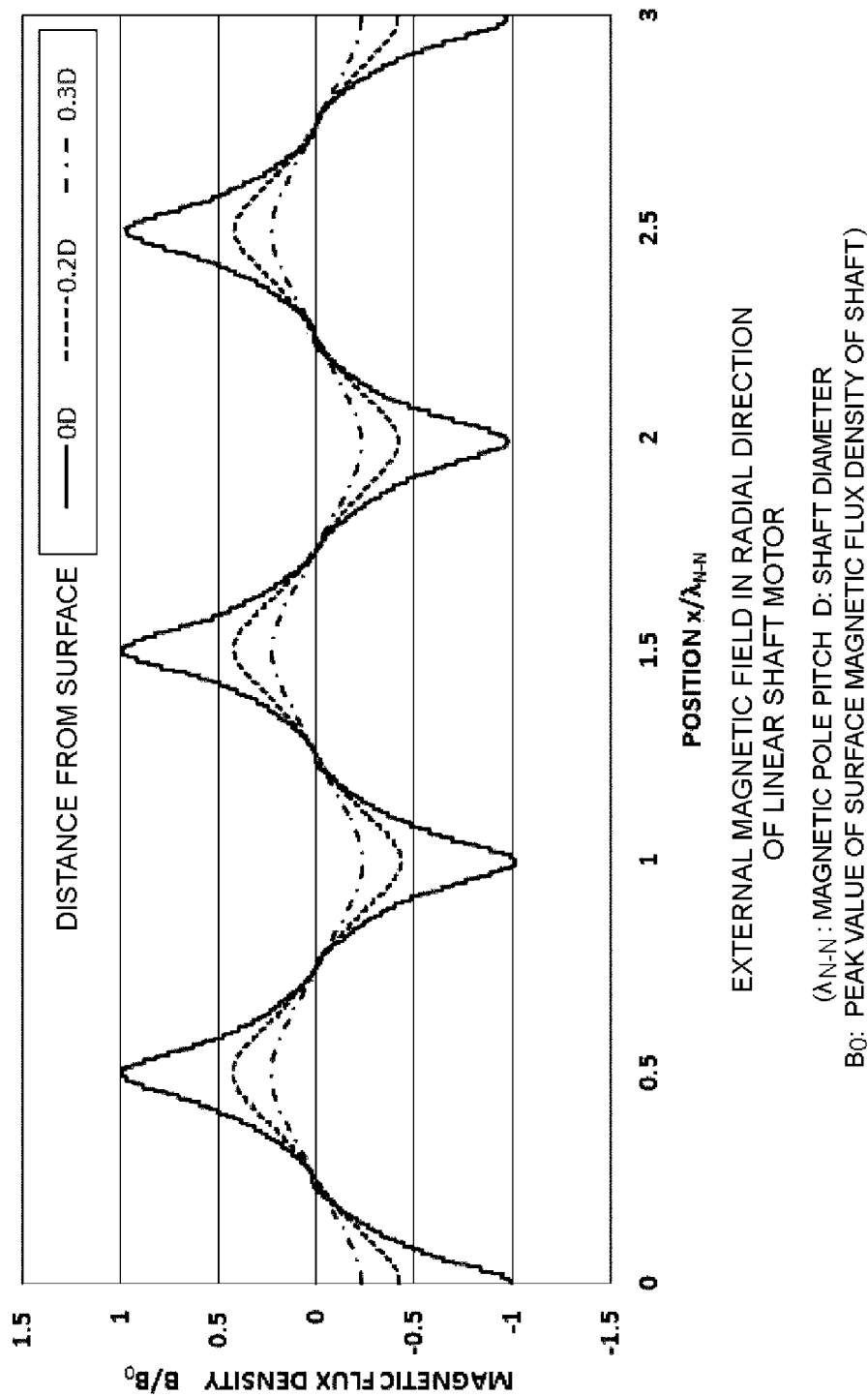
FIG. 19 is a view showing a result of measuring an external magnetic field in a radial direction of the first shaft in the linear shaft motor.

In FIGS. 13 and 14, a reference numeral 83 denotes a pair of magnetic sensors for detecting positions of the permanent magnets 12 in the first shaft 11, for example, analog Hall sensors (hereinafter abbreviated to Hall sensors). The pair of Hall sensors 83 are used for position control of the first shaft 11 in the linear shaft motor 10. The pair of Hall sensors 83 are installed at positions corresponding to the first shaft 11 and adjacent to the wide portions of the magnetic shielding plates 70 at a predetermined mounting interval in a moving direction of the first shaft 11. As shown in FIG. 18, the mounting interval of the pair of Hall sensors 83 is set to an electrical angle of 90 degrees in the waveform of the surface magnetic flux density of the first shaft 11 (permanent magnets 12). This is based on the knowledge, gained by the inventors as a result of measuring an external magnetic field of the linear shaft motor 10 in the radial direction, that the surface magnetic flux density of the first shaft 11 (permanent magnets 12) becomes a waveform close to a sine wave away from the surface of the first shaft 11 to some extent as shown in FIG. 19. In FIG. 19, $\lambda_{N\text{-}N}$ represents a magnetic pole pitch of the permanent magnets 12, D represents a diameter of the first shaft 11, and $B_0$ represents a peak value of the surface magnetic flux density of the first shaft 11.

In the present embodiment, with reference to measurement data as shown in FIG. 19, a position at which the data closer to the sine wave is obtained is determined as an installation location of the Hall sensors 83. In the present embodiment, for the following reason, the pair of Hall sensors 83 are disposed on a surface of the circuit board 80 (a surface on the side opposite to the receiving portion 51, i.e., the coil portion 15) and between large-width parts of the two magnetic shielding plates 70. That is, by forming the slits 82 in the circuit board 80, the large-width parts of the magnetic shielding plates 70 are extended into the receiving portion 51 of the coil fixing member 50. This aims to prevent the influence of the magnetic field from the linear shaft motors 10 adjacent to the pair of Hall sensors 83 installed between the large-width parts of the two magnetic shielding plates 70.

Figure 20:
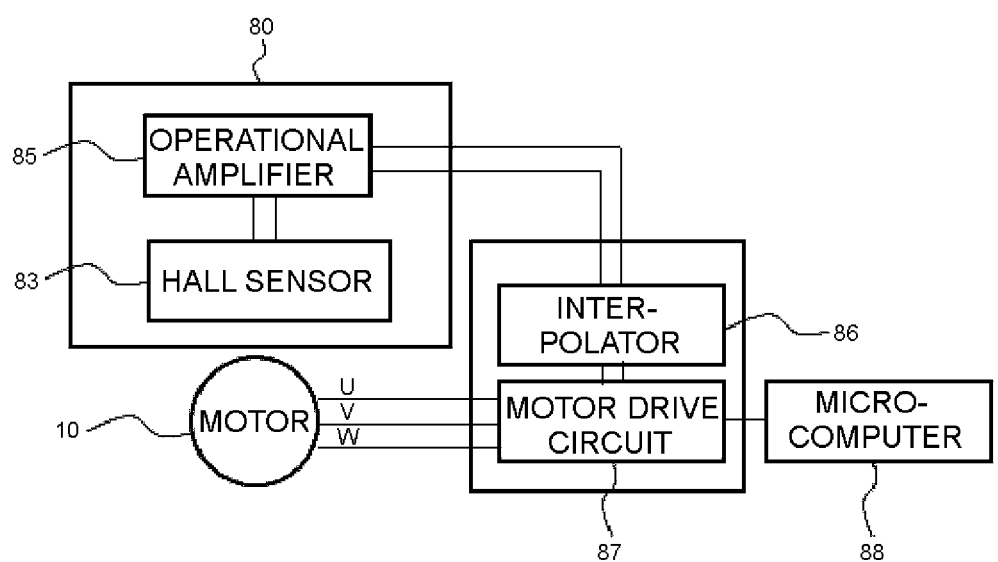
FIG. 20 is a block diagram showing a configuration of a position control system of e linear shaft motor, using the Hall sensor.

The electric circuit mounted to the circuit hoard 80 is mainly a circuit connected to the plurality of coils 14 to drive and control the four linear shaft motors 10. For the circuit, description is omitted. Referring to FIG. 20, the position control system of the linear shaft motor 10 will be described.

FIG. 20 is a block diagram of the position control system of the linear shaft motor 10, and the position control system is installed in the linear shaft motor 10 of each axis. However, a microcomputer 88 may be common to the linear shaft motors 10 of all axes. The position control system includes the two Hall sensors 83 installed on the circuit board 80, an operational amplifier 85 for processing detection signals from the two Hall sensors 83, an interpolator 86 for digitizing a signal from the operational amplifier 85, a motor drive circuit 87 for driving and controlling the first shaft 11 of the linear shaft motor 10 based on a digital signal from the interpolator 86, and the microcomputer 88 for outputting to the motor drive circuit 87 an operation command including a movement amount, a moving speed, a direction signal, and so on, required for driving the linear shaft motor 10.

The position control system has two control modes for a case where, in addition to a positive voltage signal, a negative voltage signal is generated from the detection signals of the two Hall sensors 83 (the case with signal inversion) and a case where only a positive voltage signal is generated from the detection signals of the two Hall sensors 83 (the case without signal inversion). FIG. 20 shows the case without signal inversion. In the case with signal inversion, the number of output signal lines at the operational amplifier 85 and thereafter is different.

In the Case Without Signal Inversion

1. The surface magnetic flux density of the first shaft 11 is detected by the Hall sensors 83 and output as analog voltage signals. As described above, the surface magnetic flux density of the first shaft 11 is a sine wave along the axial direction. Therefore, when the two Hall sensors 83 are arranged near the first shaft 11 at a pitch corresponding to ¼ of the magnetic pole pitch (hereinafter referred to as a magnet pitch) of the permanent magnets 12 and the magnetic flux density is detected, two analog voltage signals shifted in phase by an electrical angle of 90 degrees, that is, a sine wave (hereinafter referred to as a Sin wave) voltage signal and a cosine wave (hereinafter referred to as a Cos wave) voltage signal can be generated.

2. The analog voltage signals output from the two Hall sensors 83 are input to the operational amplifier 85. The operational amplifier 85 adjusts output voltages of the two Hall sensors 83 so as to conform to a driver input.

3. The interpolator 86 of a driver digitizes the two analog signals input from the operational amplifier 85 and divides the signals by a designated number of bits. The number of division defines resolution (magnet pitch/division number). For example, in the case where the magnet pitch is 24 mm and the division number is $2^{14}$, the resolution is 1.5 µm. As a result, the two analog voltage signals (Sin wave voltage signal and Cos wave voltage signal) become two rectangular wave signals (position signals) shifted in phase by an electrical angle of 90 degrees.

4. The motor drive circuit 87 detects a current position and a moving speed of the first shaft 11 (dispensing head 40) by the two rectangular wave signals input from the interpolator 86, and delivers a position control command defining a stop position to the linear shaft motor 10 (coil unit 15).

In the Case with Signal Inversion

1. The surface magnetic flux density of the first shaft 11 is detected by the two Hall sensors 83 and output as analog voltage signals. The surface magnetic flux density of the first shaft 11 is a sine wave along the axial direction. When the two Hall sensors 83 are arranged near the first shaft 11 at a pitch corresponding to ¼ of the magnetic pole pitch (hereinafter referred to as a magnet pitch) of the permanent magnets 12 and the magnetic flux density is detected, two analog voltage signals shifted in phase by an electrical angle of 90 degrees, that is, a Sin wave voltage signal and a Cos wave voltage signal can be generated.

2. The two analog voltage signals output from the two Hall sensors 83 are input to the operational amplifier 85. The operational amplifier 85 generates an inverted signal for each of the two input analog voltage signals (Sin wave voltage signal and Cos wave voltage signal). Thus, in addition to the Sin wave voltage signal and the Cos wave voltage signal output from the Hall sensors 83, a −Sin wave voltage signal and a −Cos wave voltage signal are generated so that the four analog voltage signals are obtained. The operational amplifier 85 adjusts output voltages of the Hall sensors 83 so as to conform to the driver input. As described above as another control mode, only two signals including the Sin wave voltage signal and the Cos wave voltage signal may be sufficient. However, by generating the −Sin wave voltage signal and the −Cos wave voltage signal, noise robustness is achieved.

3. The interpolator 86 of a driver digitizes the four analog voltage signals output from the operational amplifier 85 and divides the signals by a designated number of hits. The resolution represented by the magnet pitch and the number of divisions is as described above. Thus, the four analog voltage signals become four rectangular wave signals (position signals).

4. The motor drive circuit 87 detects a current position and a moving speed of the first shaft 10 (dispensing head 40) by the four rectangular wave signals (position signals) output from the interpolator 86, and delivers a position control command defining a stop position to the linear shaft motor 11 (coil unit 15).

Next referring to FIG. 9, a procedure for assembling and manufacturing the 8-axis independent-control dispensing device will be described. For the 8-axis independent-control dispensing device, the 4-axis independent-control dispensing device described with reference to FIG. 3 is assembled and manufactured by using the coil unit manufactured by the above-described manufacturing method. Subsequently, in a state where the circuit boards 80 are faced to each other via the center plate 60, a pair of the 4-axis independent-control dispensing devices are combined to be integrated by connecting plates 90 at longitudinal both ends of the dispensing devices and the center plate 60.

The connecting plates 90 has a laterally-facing H shape with recessed portions formed on both sides and corresponding to the recessed portions formed at the both ends of the coil fixing members 50. The connecting plates 90 are attached at two positions to each of longitudinal end faces of the pair of coil fixing members 50 and longitudinal end faces of the center plate 60 by hexagonal socket screws 91. Thus, the pair of 4-axis independent-control dispensing devices and the center plate 60 are integrated.

Figure 15:
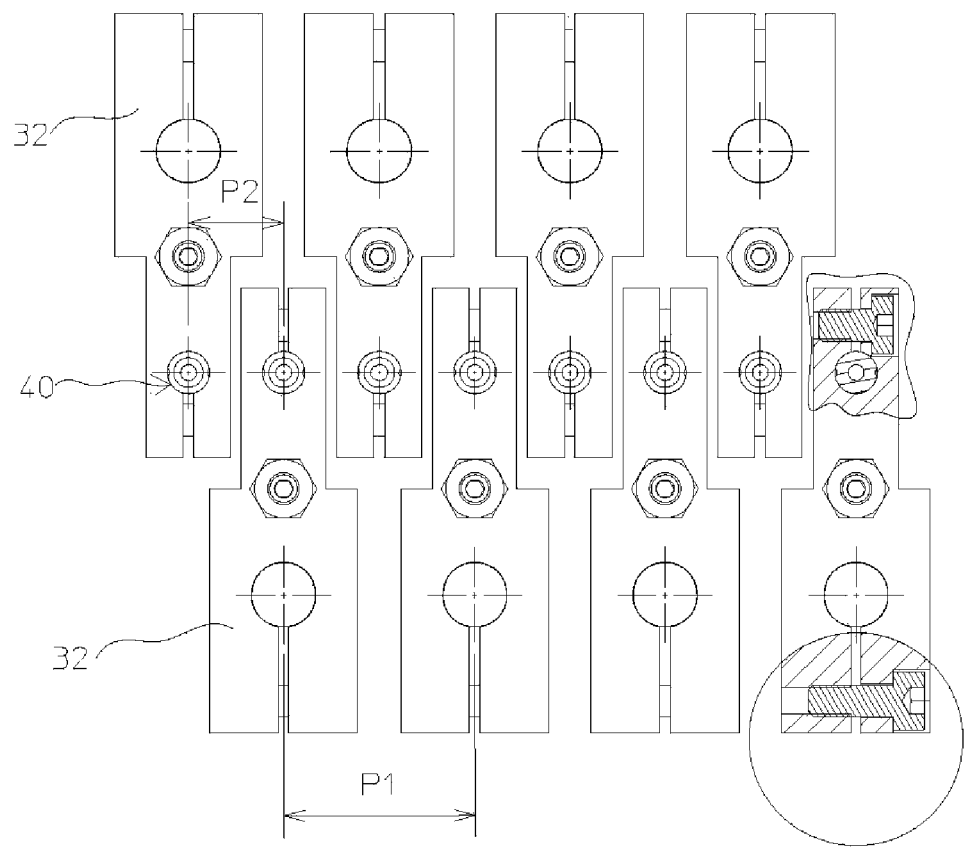
FIG. 15 is a top view showing an arrangement mode of the upper connecting member in the 8-axis independent-control dispensing device shown in FIG. 1.

In FIG. 9, the linear shaft motors 10, the dispensing heads 40, the lower connecting members 31, and the upper connecting members 32 in the 4-axis independent-control dispensing device described with reference to FIG. 5 are omitted for convenience. As described above, in a state where the four dispensing heads 40 in the 4-axis independent-control dispensing device shown in FIG. 3 are accommodated in the accommodating spaces 60a of the center plate 60, the pair of 4-axis independent-control dispensing devices and the center plate 60 are integrated by the two connecting plates 90 at the both ends thereof to form the 8-axis independent-control dispensing device as shown in FIG. 1. In particular, when the pitch (interval) of the linear shaft motors 10 is represented by P1, the arrangement of the four linear shaft motors 10 in one of the pair of the 4-axis independent-control dispensing devices and the arrangement of the four linear shaft motors 10 in the other dispensing device are shifted by P2 (=P1/2), as shown in FIG. 15.

Therefore, the four dispensing heads 40 in one of the pair of 4-axis independent-control dispensing devices and the four dispensing heads 40 in the other dispensing device are integrated in a state of being alternately accommodated in the eight accommodating spaces 60a of the center plate 60. As a result, as the 8-axis independent-control dispensing device, even if the pitch (interval) P2 of the eight dispensing heads 40 is small, the pitch (interval) P1 of the linear shaft motors 10 can be large. Thus, malfunction due to magnetic field interference between adjacent ones of the linear shaft motors 10 can he prevented even if sizes of the permanent magnets 12 and the coils 14 are not reduced.

The 8-axis independent-control dispensing device according to the present embodiment is combined with a transport mechanism (not shown) for reciprocating between a sucking position and a discharging position of a liquid. Therefore, the connecting plates 90 may be omitted by fixing the pair of coil fixing members 50 and the center plate 60 to a part of the transport mechanism.

Figure 16:
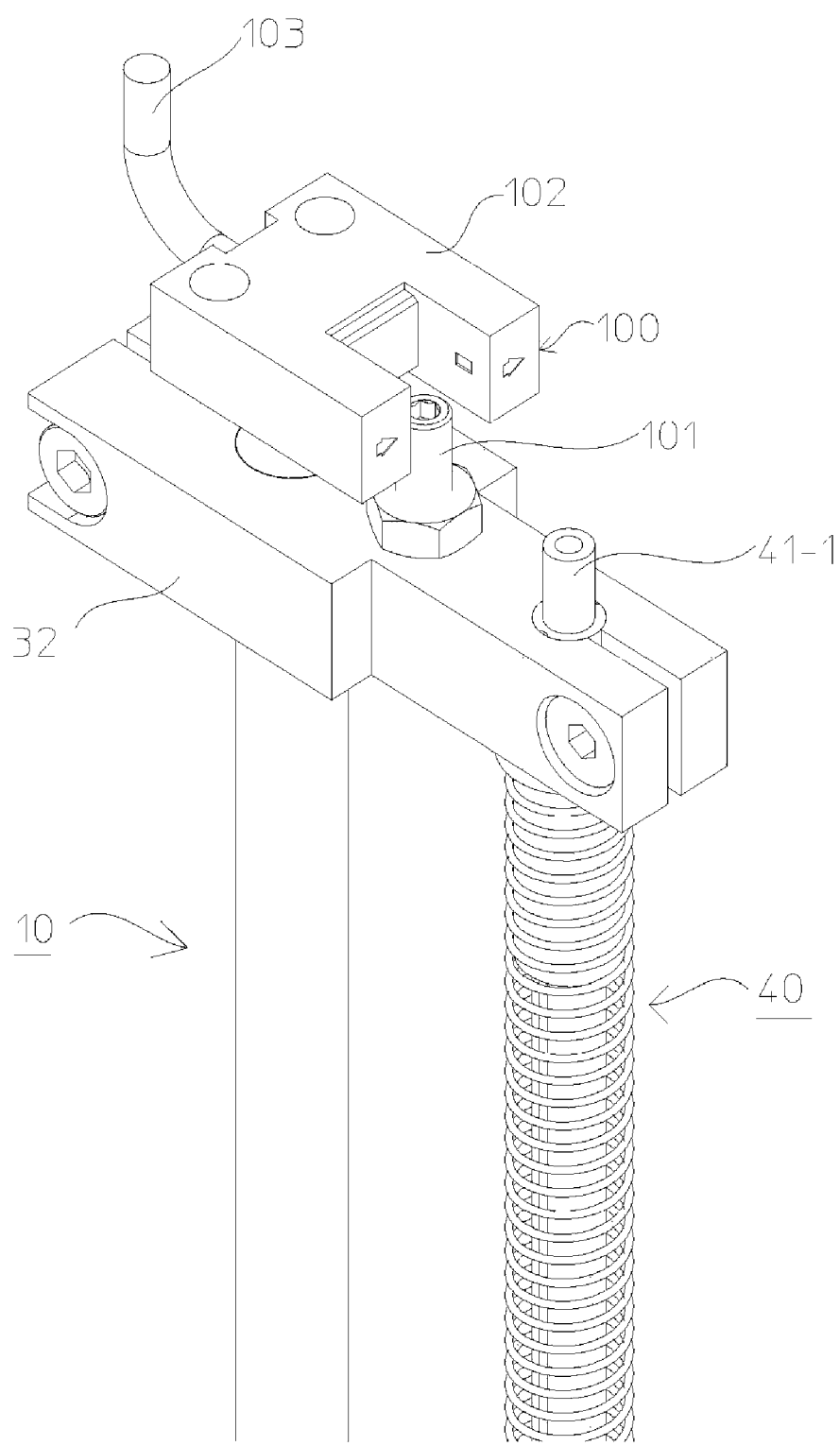
FIG. 16 is a perspective view for describing detecting means for detecting an upper movement position of the upper connecting member in the 8-axis independent-control dispensing device shown in FIG. 1.
Figures 17A, 17B:
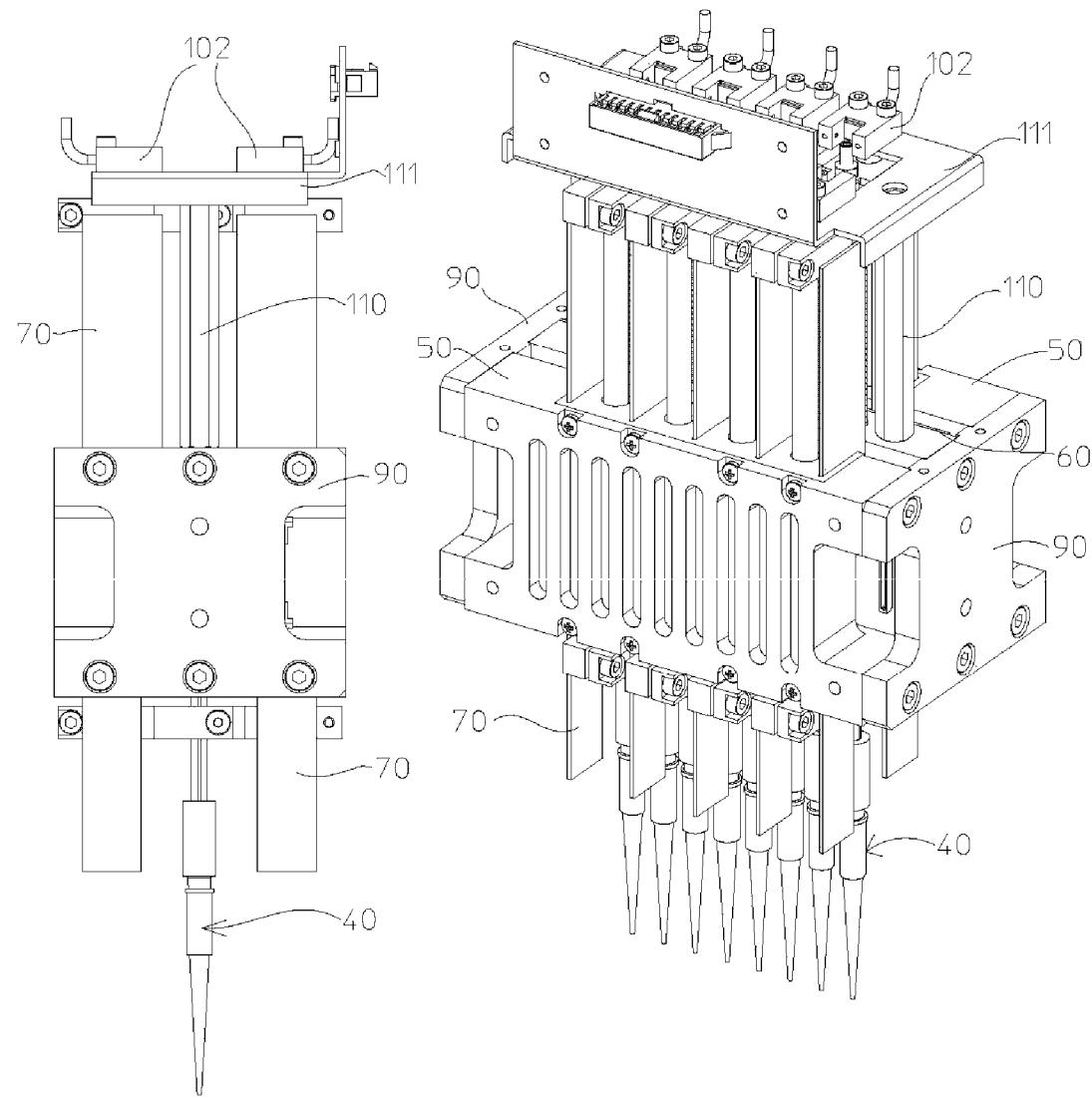
FIGS. 17A and 17B are views for describing an example of an installation mode of the detecting means shown in FIG. 16.

Next, with reference to FIG. 16 and FIGS. 17A and 17B, position detecting means will be described which is necessary for position control for discharging and sucking the liquid by the dispensing heads 40 by detecting an upper movement position (upper limit position) of the upper connecting member 32. FIG. 16 is a perspective view for describing a detector 100 for detecting the upper movement position of the upper connecting member 32 in the 8-axis independent-control dispensing device shown in FIG. 1. FIGS. 17A and 17B are views for describing an example of an arrangement mode of the detector 100 shown in FIG. 16, wherein FIG. 17A is a side view of the 8-axis independent-control dispensing device and FIG. 17B is a perspective view of the 8-axis independent-control dispensing device.

In this example, apart from the position control of the linear shaft motors 10 by position detection signals from the pair of Hall sensors 83, the upper movement position of the upper connecting member 32 is detected as the upper limit position to thereby detect the upper movement position of the dispensing heads 40 in the same combination. Therefore, as shown in FIG. 16, each of the upper connecting members 32 is provided with a detected protrusion 101 of a hollow shaft shape formed on an upper end face near its center. A photosensor 102 is provided as a limit sensor so that light is blocked when the detected protrusion 101 is moved upward to a predetermined position. As to the photosensor 102, as shown in FIGS. 17A and 17B, a sensor installation substrate 111 is fixedly arranged, via a support column 110 fixed to the center plate 60, at a position higher than the upper movement position of the upper connecting member 32. Eight photosensors 102 are installed on the sensor installation substrate 111 so as to correspond to the eight detected protrusions 101 of the 8-axis independent-control dispensing device. When the linear shaft motors 10, the dispensing heads 40, the lower connecting member 31, and the upper connecting member 32 are configured to be movable portions in the 8-axis independent-control dispensing device, the sensor installation substrate 111 (photosensor 102) is a fixed portion together with the pair of coil fixing members 50 and the center plate 60.

The detector 100 is used not only as means for detecting the upper movement position of the dispensing head 40 associated with a dispensing operation of sucking and discharging the liquid, but also as means for performing origin positioning when the dispensing operation is started. The origin positioning is as follows.

At the start of the dispensing operation, the detected protrusion 101 blocks an optical path of the photosensor 102, and upward movement of each dispensing head 40 is performed until a detection signal is output from the photosensor 102. By this operation, an offset operation is performed using the detection signal output from the photosensor 102 as a reference. Since an offset position has the same height for the respective axes, this position is used as a reference point for positioning control of the linear shaft motor 10, which will later be described.

In FIGS. 16 and 17A and 17B, a signal transmission cable 103 extends from one end of the photosensor 102. For convenience, the cable is shown in a cut state, leaving only a part thereof.

Effect of the Embodiment (1) As to the above-mentioned 8-axis independent-control dispensing device, the position detecting means for position control of the linear shaft motor of each axis in the dispensing device can be realized inexpensively and, as a result, it is possible to provide the 8-axis independent-control dispensing device effective in cost reduction.

(2) Further, the pitch (interval) P1 of the linear shaft motors 10 need not be reduced even with multiple axes such as eight axes, as described above. Therefore, the dispensing device can be constituted without reducing the size of the permanent magnets 12 and the coils 14 correspondingly. This is effective in the following aspects.

The multi-axis dispensing device is required to be reduced in pitch (interval) between the dispensing heads. This is because, by reducing the pitch between the dispensing heads, the multi-axis dispensing device as a whole can be compact so as to increase a movable range. However, in the case of the existing multi-axis dispensing device with one-row arrangement of a plurality of dispensing heads, the diameter of the linear shaft motor must be reduced in order to reduce the pitch between the dispensing heads. For this purpose, the diameter of the permanent magnet must be reduced or the diameter of the coil, i.e., the number of turns of the coil must be reduced. This means that a thrust force (driving torque) of each axis becomes small. However, up-and-down movement of the dispensing head requires a predetermined thrust force. This is because, referring to FIG. 8 for example, removal of the chip 42 attached to the tip of the nozzle 43 is automated by moving the head body 41 upward in a state where a narrow part between the chip 42 and the nozzle 43 is nipped by a jig (not shown) at a position different from sucking and discharging positions of the liquid. In other words, when the thrust force for the up-and-down movement of the dispensing head becomes small, the automated removal of the chip 42 is difficult.

In contrast to the above-mentioned situation, according to the 8-axis independent-control dispensing device according to the present embodiment, the pitch between the dispensing heads is reduced and the predetermined thrust force (driving torque) can be obtained during up-and-down movement of the dispensing head without reducing the diameter of the linear shaft motor. Thus, the above-described problem does not occur.

(3) In general, the coil portions of the linear shaft motors are accommodated in casings each for each individual coil portion. On the other hand, in the present embodiment, the plurality of coil portions 15 are collectively unitized because of the structure in which the plurality of first shafts 11 are arranged adjacent to each other. Therefore, it is possible to realize reduction in number of components in the coil unit, reduction in number of assembling steps, and space saving.

(4) Since the magnetic shielding plates 70 are installed on both sides of each coil portion 15 along the center axis direction and fixation of the coil portions 15 and fixation of the magnetic shielding plates 70 can be performed simultaneously by the curable resin 75. Therefore, in this respect also, it is possible to realize reduction in number of components in the coil unit, reduction in number of assembling steps, and space saving.

While the preferred embodiment has been described in the case where the present invention is applied to the 8-axis independent-control dispensing device, it is needless to say that the present invention is not limited to the above-described embodiment. That is, the present invention is applicable to either an independent-control or a simultaneous-control multi-axis dispensing device with two or more axes, and is also applicable to multi-axis linear motor actuators in general without being limited to the dispensing device.

The present invention is also applicable to a multi-axis linear motor actuator in which a plurality of linear shaft motors, each configured as an independent unit, are arranged in a row at a predetermined pitch (and a multi-axis dispensing device including dispensing heads in combination with the linear shaft motors), wherein the circuit board with the slits, the magnetic shielding plate having the wide portion, and the Hall sensors described above are combined according to another aspect described in the following, without the above-mentioned coil fixing member.

Another Aspect

A multi-axis linear motor actuator comprising:
a circuit board which has a size sufficient to cover a plurality of coil portions in a plurality of linear shaft motors arranged in a row and which is combined with the plurality of linear shaft motors so as to be adjacent thereto and parallel to an arrangement direction of the plurality of linear shaft motors; and
a plurality of magnetic shielding plates, longer than the coil portion, each arranged and fixed along an axial direction at least at a position corresponding to a position between adjacent ones of the plurality of coil portions arranged in a row; and
a pair of Hall sensors installed in the circuit board in each of regions corresponding to shafts, same in number as the plurality of linear shaft motors, at intervals in a moving direction of the shaft;
each of the magnetic shielding plates having a wide portion with a width greater than a depth of a receiving space at least at a part corresponding to the region where the pair of Hall sensors are installed;
the circuit board being provided with a plurality of first slits each for inserting the wide portion;
the pair of Hall sensors being installed adjacent to the wide portion of the magnetic shielding plate.

This application claims the benefit of priority based on Japanese Patent Application No. 2020-77351, filed on Apr. 24, 2020, the disclosure of which is incorporated herein in its entirety.

DESCRIPTION OF REFERENCE NUMERALS

10: linear shaft motor, 11: first shaft, 12: permanent magnet, 13: cylindrical body, 14: coil, 16: coil integration cylinder, 31: lower connecting member, 32: upper connecting member, 40: dispensing head, 41: head body, 42: chip, 43: nozzle, 50: coil fixing member, 51: receiving portion, 52: coil end, 60: center plate, 70: magnetic shielding plate, 80: circuit board, 83: Hall sensor, 90: connecting plate, 100: detector, 102: photosensor, 111: sensor installation substrate.

The invention claimed is:

1. A multi-axis linear motor actuator comprising a plurality of linear shaft motors arranged in a row at a predetermined pitch, the linear shaft motors each comprising a magnet portion for the linear shaft motor and a coil portion for the linear shaft motor, the magnet portion including a plurality of permanent magnets which are connected to each other with the same magnetic poles faced to each other and which are fixed to a support member having a length equal to or longer than a total length of the plurality of permanent magnets connected to each other to form a shaft movable in an axial direction, the coil portion including a plurality of cylindrical coils connected to each other in a center axis direction and combined with the shaft to concentrically enclose the shaft via a gap so that the shaft is movable with respect to the axial direction, the multi-axis linear motor actuator including:
a circuit board which has a size sufficient to cover a plurality of the coil portions in the plurality of linear shaft motors arranged in a row and which is combined with the plurality of linear shaft motors so as to be adjacent thereto and parallel to an arrangement direction of the plurality of linear shaft motors; and
a plurality of magnetic shielding plates, longer than the coil portion, each arranged and fixed along the axial direction at least at a position corresponding to a position between adjacent ones of the plurality of coil portions arranged in a row; and
a pair of Hall sensors installed in the circuit board in each of regions corresponding to the shafts, same in number as the plurality of linear shaft motors, at intervals in a moving direction of the shaft;
each of the magnetic shielding plates having a wide portion with a width greater than a diameter of the coil portion at least at a part corresponding to the region where the pair of Hall sensors are installed;
the circuit board being provided with a plurality of first slits each for inserting the wide portion;
the pair of Hall sensors being installed adjacent to the wide portion of the magnetic shielding plate.

2. The multi-axis linear motor actuator according to claim 1, wherein:
the pair of Hall sensors are installed on a surface of the circuit board that is opposite to another surface faced to the coil portion; and
an interval between the pair of Hall sensors is set so as to correspond to an electrical angle of 90 degrees of a sine waveform of a surface magnetic flux density of the magnet portion.

3. The multi-axis linear motor actuator according to claim 1, further comprising:
a coil fixing member having a receiving portion in which the plurality of coil portions in the plurality of linear shaft motors are fixed in a state of being arranged in a row at the predetermined pitch;
the circuit board being attached to the receiving portion of the coil fixing member.

4. The multi-axis linear motor actuator according to claim 2, further comprising:
a coil fixing member having a receiving portion in which the plurality of coil portions in the plurality of linear shaft motors are fixed in a state of being arranged in a row at the predetermined pitch;
the circuit board being attached to the receiving portion of the coil fixing member.

* * * * *